United States Patent [19]

Harjar et al.

[11] Patent Number: 4,459,898
[45] Date of Patent: Jul. 17, 1984

[54] STREAMLINED MULTI-AXIS ROBOT WRIST ASSEMBLY WITH PARTIALLY ENCLOSED HYDRAULIC AND ELECTRICAL LINES TO MINIMIZE THE WRIST ENVELOPE

[75] Inventors: Martin J. Harjar, Vermilion; Jeffrey S. Noss, Bay Village, both of Ohio

[73] Assignee: Nordson Corporation, Amherst, Ohio

[21] Appl. No.: 328,912

[22] Filed: Dec. 9, 1981

[51] Int. Cl.³ .............................................. F01B 1/02
[52] U.S. Cl. ........................................ 92/61; 92/120; 92/128; 174/86; 414/4; 414/730
[58] Field of Search .................... 414/4, 730; 418/186; 92/5 L, 5 R, 61, 128, 120, 121, 122, 123, 124, 125; 174/86; 285/332, 310, 406, 189; 91/361; 307/116, 119, 122, 123, 132 R, 139

[56] References Cited

U.S. PATENT DOCUMENTS

| | | | |
|---|---|---|---|
| 3,414,136 | 1/1966 | Moore et al. | 91/361 |
| 3,526,417 | 9/1970 | Aumiller | 285/332 |
| 4,068,763 | 1/1978 | Fletcher et al. | 414/4 |
| 4,239,431 | 12/1980 | Davini | 414/730 |
| 4,279,195 | 7/1981 | Miller | 92/128 |
| 4,365,928 | 12/1982 | Baily | 414/4 |

FOREIGN PATENT DOCUMENTS 54-49755  4/1979  Japan ................................... 414/730

OTHER PUBLICATIONS

From 2/82 Hydraulics & Pneumatics, vol. 35, #2, "Minicomputer Controls Robot's Six Electrohydraulic Servoactuators".

Primary Examiner—Robert E. Garrett
Assistant Examiner—Scott L. Moritz
Attorney, Agent, or Firm—Wood, Herron & Evans

[57] ABSTRACT

A multi-axis robot wrist assembly having three hydraulically operated rotary actuators which are mechanically connected in series such that the output of each actuator drivingly positions the body of the succeeding actuator located outboard thereof. The hydraulic connection to any wrist actuator, except the innermost actuator, includes a series-connection of (a) internal passage(s) through actuator(s) which are located inboard of the actuator in question and (b) external line(s) between the actuator in question and actuator(s) located inboard thereof. By connecting all but the innermost wrist actuator through hydraulic paths which are at least partially internal to actuators positioned inwardly thereof, the overall envelop of the wrist assembly is reduced.

Also included for the purpose of minimizing the wrist envelop is an electrical cable arrangement for connecting the electrical outputs of position transducers associated with each wrist actuator to an electrical plug or other suitable connection located on the robot arm which mounts the wrist assembly. The electrical cable, includes semicircular folded sections between each pair of adjacent actuators and partially encircling the rotatable output member interconnecting them, to permit adjacent actuators to rotate with respect to each other without damaging the electrical cable spanning them, which remains neatly folded between the actuators.

The mechanical interconnection between the rotary output member of one actuator and the body of the succeeding actuator is detachable, facilitating actuator replacement in the field without replacing the entire wrist assembly.

8 Claims, 9 Drawing Figures

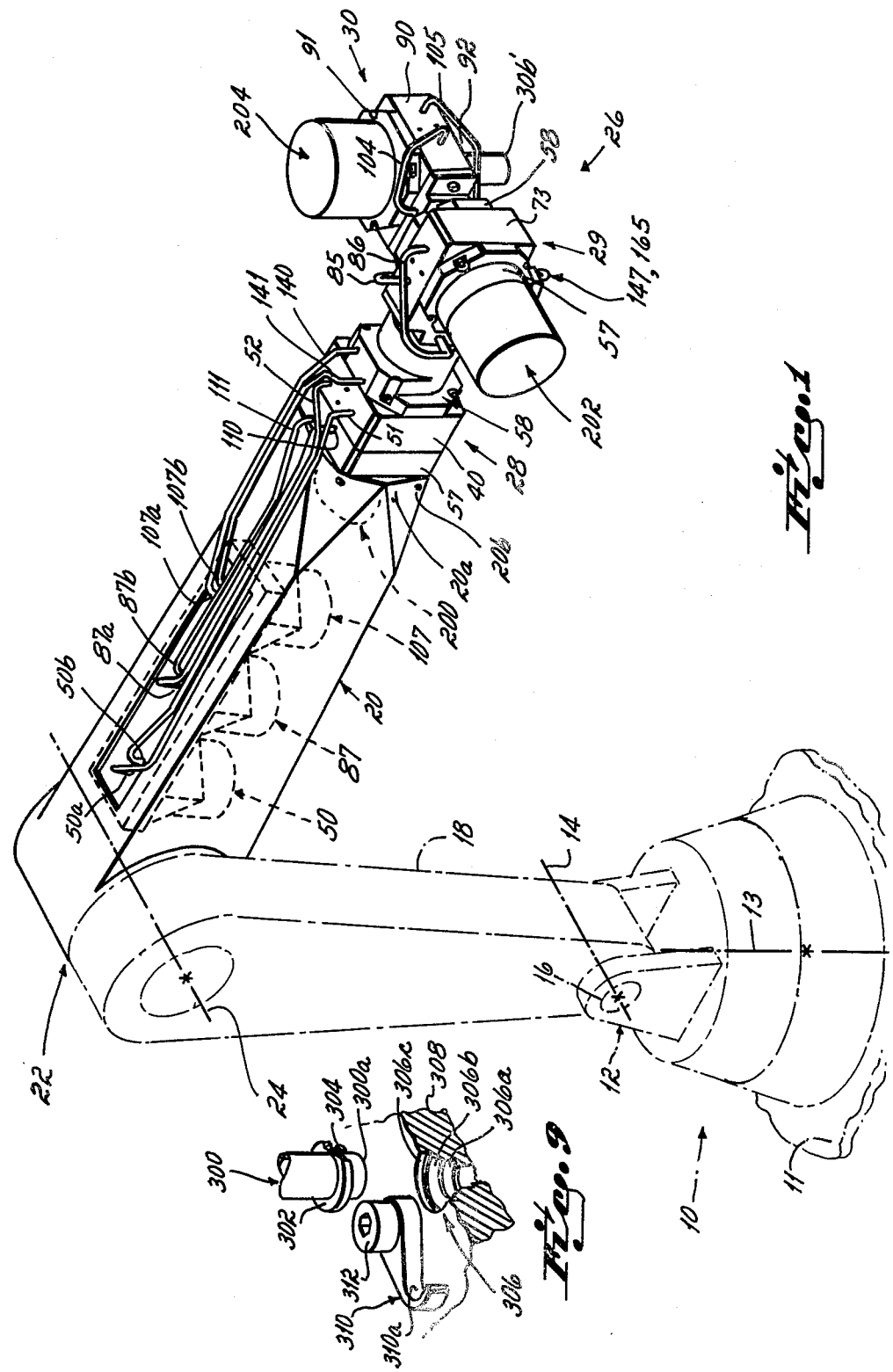

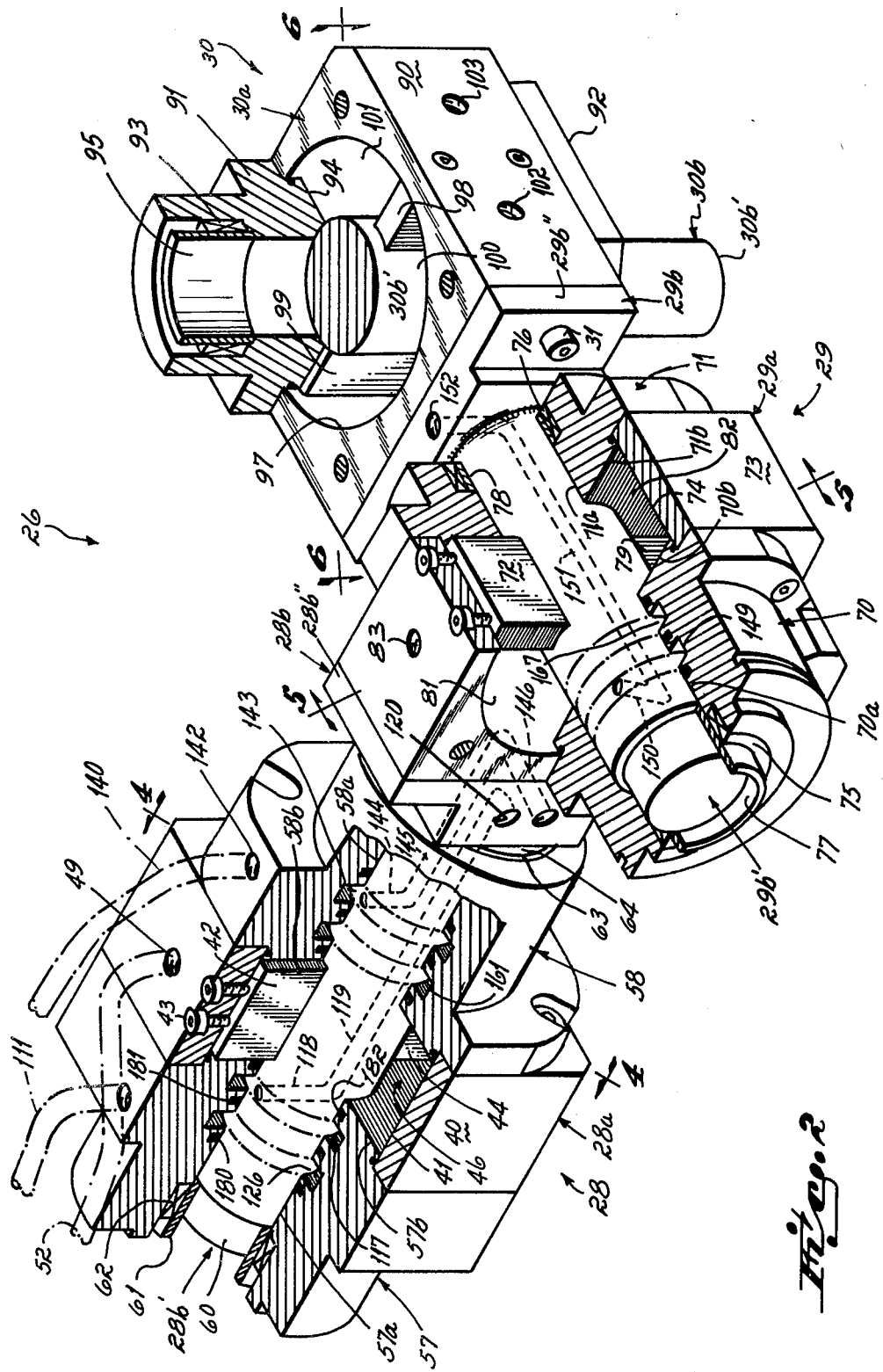

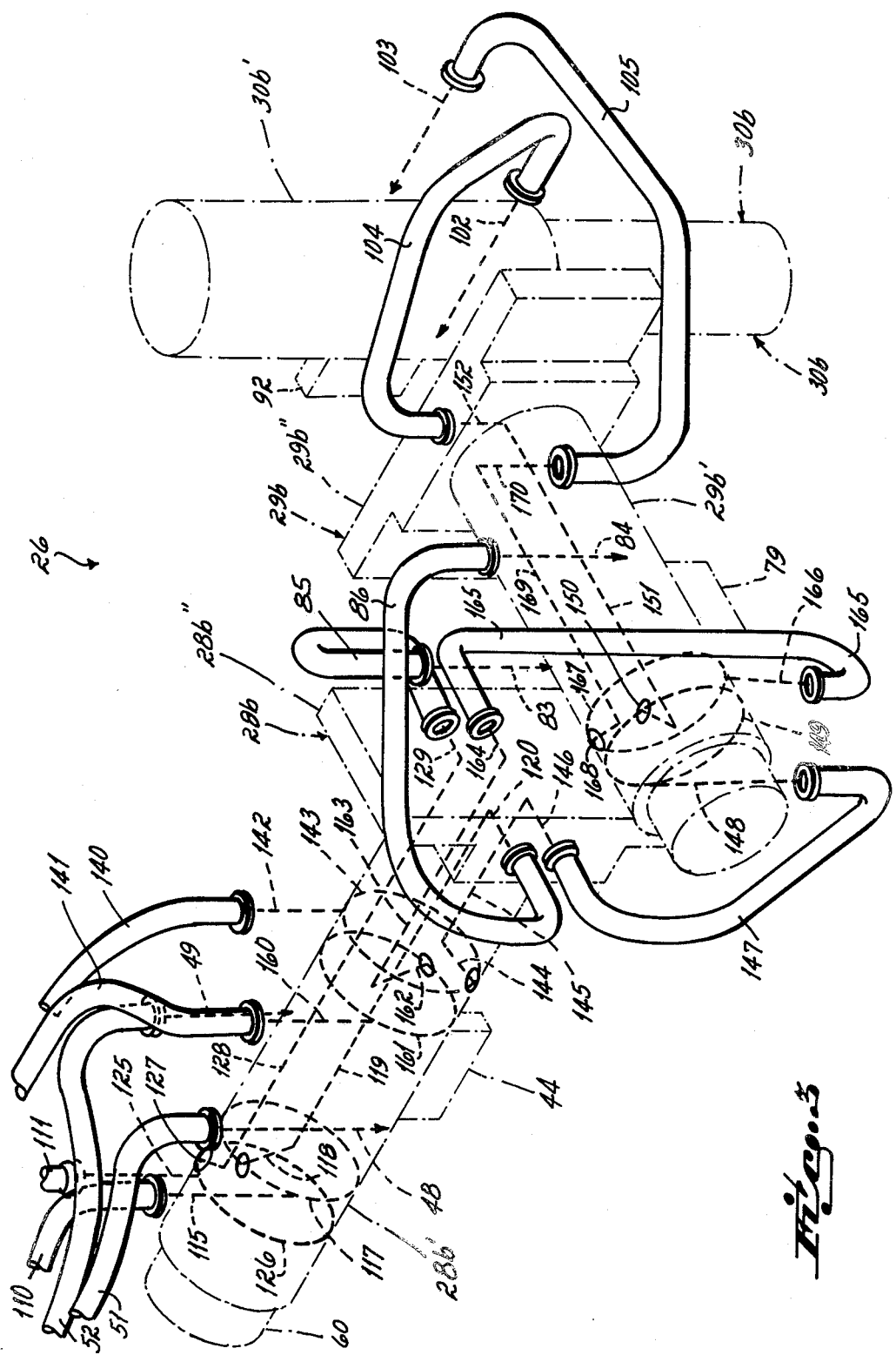

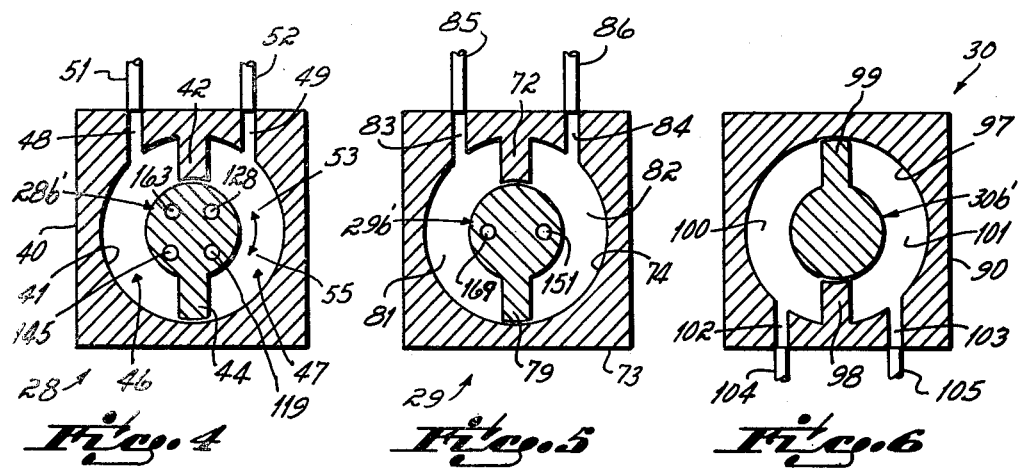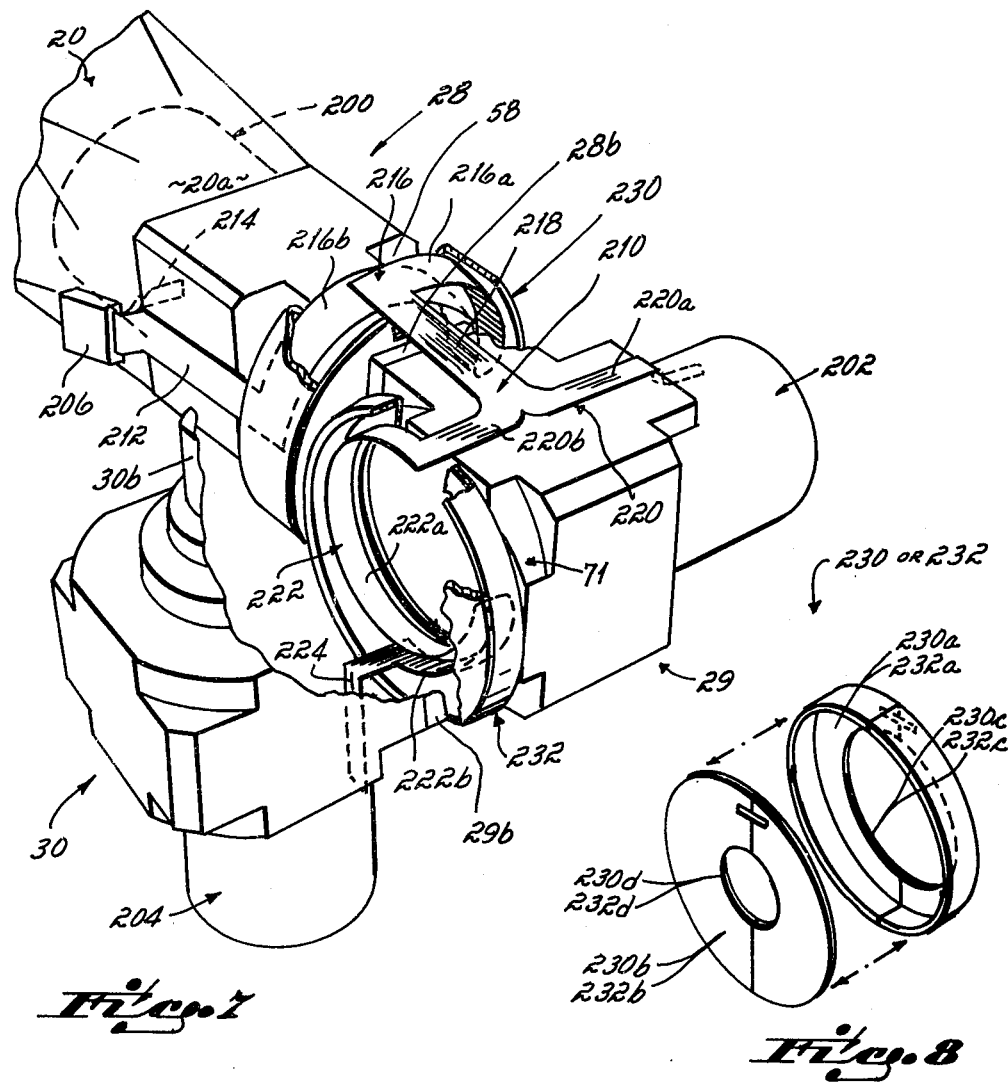

STREAMLINED MULTI-AXIS ROBOT WRIST ASSEMBLY WITH PARTIALLY ENCLOSED HYDRAULIC AND ELECTRICAL LINES TO MINIMIZE THE WRIST ENVELOPE

This invention relates to robots, and more particularly to a robot wrist assembly designed to minimize its overall envelop.

Mechanical robots are currently available for such tasks as mechanical assembly, welding, spray painting, loading and unloading, and the like. Such robots typically include a stationary base from which extend one or more relatively elongated power-operated articulated links at the output end of which is mounted a multi-axis wrist. Since the output of the wrist interacts with the workpiece being operated upon by the robot, to maximize the maneuverability of the wrist with respect to the workpiece, it is desirable to make the wrist assembly as compact and streamlined as possible. In this way the wrist assembly can be maneuvered into cramped spaces to operate upon a workpiece without mechanical interference between the wrist assembly and the workpiece, thereby increasing the overall utility of the robot.

In the past, robot wrist assemblies of the type having hydraulically-operated actuators have been characterized by the presence of individual hydraulic hoses which are relatively loosely draped between remotely located individually-controlled pressurized fluid sources and their respectively associated wrist actuators. The loose draping of the hoses provides sufficient slack to permit the wrist actuators to rotate relative to each other. The loosely draped hoses, while permitting relative movement of the actuators, has unnecessarily increased the envelop of the wrist, thereby reducing wrist maneuverability, particularly in spatially cramped situations associated with certain types of workpieces. Loosely draped actuator hoses present a further problem, namely, damage to the hoses themselves. This can occur should the hoses become entangled or catch on the workpiece as the wrist moves relative to it in the course of, for example, returning to a home position remote from the workpiece after completing an operation on it.

Problems similar to the type described above are also present where electrical cables must be connected between a remote electronic controller and components of the wrist, such as, position transducers associated with the actuators thereof. Electrical cables, which are loosely draped relative to the wrist assembly to permit actuator rotation, can unduly increase the envelop of the wrist assembly and thereby reduce wrist maneuverability, and/or catch or become entangled with a workpiece as the robot wrist moves relative to it, thereby damaging the cables.

Accordingly, it has been an objective of this invention to provide a multi-axis robot wrist assembly having fluid-operated actuators with associated position transducers, and hydraulic lines and electrical cables connected thereto from remotely located control means, which has a minimum overall wrist envelop thereby increasing maneuverability and reducing the likelihood of hose and/or cable damage due to entanglement with a workpiece. This objective has been achieved in accordance with certain principles of this invention by routing hydraulic fluid from a remote source to all but the innermost wrist actuator through a series-connection of paths which include (a) integral paths within the actuator which extend only between relatively movable components thereof, and (b) external paths outside the actuator which extend between relatively immovable parts of adjacent actuators through which the mechanical driving connection between adjacent actuators is achieved. This prevents undue weakening of the walls of the actuators and unduly tortuous and restricted fluid flow paths, since the internal paths within the actuators which hydraulically route pressurized fluid to succeeding actuators are not unduly multiplied. Moreover, since the parts of adjacent actuators connected by the external hydraulic lines do not rotate relative to each other, the length of the external hydraulic lines can be kept to a minimum, in contrast to the loosely draped hydraulic line configuration prevalent in prior art robot wrist assemblies where the external lines connected hydraulic components which moved relative to each other.

In accordance with certain additional principles of this invention, the envelop of the wrist assembly is further minimized by providing an electrical cable spanning adjacent, relatively moving actuators with an intermediate cable section located between the actuators which is folded back upon itself to provide superimposed first and second cable portions connected to each other at a fold, with the intermediate section being formed into a generally arcuate shape partially encircling the output shaft which mechanically drivingly interconnects one actuator to the other. In accordance with this arrangement, the first and second superimposed arcuate cable portions have lengths which change inversely as the two actuators are rotated relative to each other by the output shaft of the one actuator, thereby accommodating the relative rotational motion of the actuators. Since the output shaft has a diameter substantially less than the overall transverse dimension of its actuator body, the arcuate cable section disposed between adjacent actuators lies comfortably within the envelop defined by the actuator bodies. Thus, the existence of an electrical cable spanning two actuators which move relative to each other does not increase the envelop of the relatively moving actuators.

These and other advantages, features, and objectives of the invention will become more readily apparent from a detailed description thereof taken in conjunction with the drawings in which:

FIG. 1 is a perspective view of a six-axis robot incorporating a three-axis wrist with combined internal/external hydraulic routing of this invention.

FIG. 2 is a perspective view, partially cut away, of the wrist and the outboard end of the robot arm associated therewith, showing the combined internal and external hydraulic routing for the wrist actuators.

FIG. 3 is a schematic perspective view of the wrist showing the internal and external hydraulic routing paths for the wrist actuators.

FIG. 4 is a diagrammatic cross-sectional view along line 4—4 of FIG. 2.

FIG. 5 is a diagrammatic cross-sectional view along line 5—5 of FIG. 2.

FIG. 6 is a diagrammatic cross-sectional view along line 6—6 of FIG. 2.

FIG. 7 is a schematic perspective view of the wrist assembly showing the electrical cable assembly for the wrist transducer connections.

FIG. 8 is a diagrammatic perspective view of a conductor shield.

FIG. 9 is a perspective view, partially cut-away, showing a preferred form of coupling between the external hydraulic conduits and the actuators.

With reference to FIG. 1, a six-link, six-axis robot is shown incorporating a preferred embodiment of the multi-axis wrist of this invention which has its plural serially-connected, hydraulically-operated wrist actuators hydraulically interconnected through a combination of internal and external connections to minimize the envelop thereof. The preferred form of robot includes a base 10 which rests on the floor, ground, or other suitable stationary support 11. Extending vertically from the upper portion of the base 10 is a yoke 12. The yoke 12 is mounted by means (not shown) for azimuthal motion about a vertical axis 13. An actuator for the yoke 12, also not shown, and preferably of the rotary hydraulic type, is provided for rotating the yoke 12 bidirectionally about a vertical axis 13. The yoke 12 constitutes one link and provides one degree of freedom for the six-link, six-axis robot shown in FIG. 1 incorporating the wrist of this invention.

Extending upwardly from the yoke 12 and mounted for bidirectional rotational motion about a horizontal axis 14 by a suitable bearing or shoulder joint 16 is an arm 18. Associated with the shoulder joint 16 is an actuator (not shown), also preferably of the rotary hydraulic type, for bidirectionally rotating the arm 18 about horizontal axis 14. The arm 18 constitutes the second link and second degree of freedom of the multi-link, multi-axis robot shown in FIG. 1 incorporating the wrist of this invention.

Extending from the upper end of the arm 18 is a forearm 20. Forearm 20 is connected at its inner end to the upper end of the arm 18 by a suitable bearing or elbow joint 22 which permits bidirectional rotational motion of the forearm 20 with respect to the arm 18 about horizontal axis 24. Associated with the elbow joint 22 is a suitable actuator (not shown), preferably of the rotary hydraulic type, for imparting to the forearm 20 the desired degree of rotational motion with respect to the arm 18. The forearm 20 constitutes the third link and third degree of freedom of the robot shown in FIG. 1 incorporating the wrist of this invention.

The hydraulic actuator for the yoke 12, which is enclosed within the base 10 although not shown in FIG. 1, is supplied with pressurized hydraulic fluid through suitable hydraulic hoses which are also enclosed within the base 10. The actuators for the shoulder joint 16 and the elbow joint 22 are provided with pressurized hydraulic fluid by suitable hydraulic hoses extending from the base 10. The hydraulic hoses for the elbow joint and shoulder joint actuators may, if desired, be strapped to the exterior of the arm 18 and yoke 12, respectively, with suitable slack being provided in the hoses to facilitate rotation of the arm relative to the yoke and rotation of the yoke relative to the base 10, respectively.

The multi-axis wrist assembly 26 of this invention, which incorporates combined internal and external hydraulic routing to the rotary hydraulic actuators thereof to minimize the wrist envelop, preferably includes three axes and is mounted to the outboard end 20a of the forearm 20. The three degrees of freedom provided by the three-axis wrist assembly 26, as shown in FIGS. 2 and 3, are provided by three bidirectional rotary hydraulic actuators 28, 29, and 30 which are mechanically series-connected. Each rotary hydraulic wrist actuator includes a body and an output member which bidirectionally rotates relative to the body, with the rotary output member of each wrist actuator being fixedly mounted to the body of the successively outboard actuator.

More specifically, the rotary hydraulic actuator 28 of the wrist assembly 26, which constitutes the innermost actuator of the wrist assembly, includes a body 28a which is removably secured to the outboard end 20a of forearm 20 by suitable fasteners 20b, and an output member 28b which bidirectionally rotates about an axis which is generally coaxial with the longitudinal axis of the forearm 20. The rotary hydraulic actuator 29, which constitutes the intermediate actuator of the wrist assembly 26, includes a body 29a which is fixedly connected to the rotary output member 28b of the innermost wrist actuator 28, and an output member 29b which rotates bidirectionally with respect to the body 29 about an axis which is generally perpendicular to the rotational axis of the output member 28b of actuator 28. The third and outermost rotary hydraulic actuator 30 of the wrist assembly 26 includes a body 30a which is rigidly secured to the rotary output member 29b of the intermediate actuator 29, and an output element 30b which is mounted for bidirectional rotary motion relative to the body 30a about an axis which is generally perpendicular to the rotational axis of the output member 29b of the intermediate actuator 29. The output member 30b of the wrist assembly actuator 30 not only constitutes the output of the wrist assembly 26, but also constitutes the output member of the six-link, six-axis robot in which the wrist of this invention is incorporated.

The innermost wrist actuator 28, considered in more detail, includes a central vane housing or cylinder 40 which is generally in the form of a rectangular block having an internal bore 41 of circular cross section. Extending radially inwardly from the bore is a stationary or fixed vane 42. The vane 42 is preferably secured to the interior surface of the bore 41 with suitable fasteners 43. Extending axially through the bore 41 of the actuator vane housing or cylinder 40 is a shaft 28b' which is integral with a generally transversely disposed block 28b''. The shaft 28b' and the transverse block 28b'' collectively constitute the rotary output member 28b of the actuator 28. Secured to the shaft 28b' in the region of the bore 41 of the central vane housing or cylinder 40 is a movable vane 44 which extends in a radial direction and which is fixedly secured to the shaft 28b' by suitable fasteners (not shown). The fixed vane 42 associated with the cylinder 40 and the movable vane 44 associated with the shaft 28b' collectively divide the bore 41 which has a diameter substantially larger than that of the shaft 28b' into two variable volume sections 46 and 47. Communicating with each of the sections 46 and 47 are transverse hydraulic passages 48 and 49, respectively, formed in the cylinder 40. The passages 48 and 49 connect the chambers 46 and 47 to the outputs 50a and 50b of a bidirectional servo valve 50 via hydraulic lines 51 and 52.

The servo valve 50 may be of any suitable type, well known in the art, which controls the flow rate and direction of pressurized fluid from a pump (not shown) for providing pressurized fluid selectively to one or the other of the lines, such as line 51, for pressurizing chamber 46 while permitting fluid to exhaust from chamber 47 via passage 49 and hydraulic line 52, for the purpose of causing the actuator output member 28 to rotate in a counterclockwise direction as shown by arrow 53 in FIG. 4. Alternatively, and on a selective basis, the servo valve 50 provides pressurized fluid to the chamber 47 via hydraulic line 52 and passage 49, while exhausting fluid from chamber 46 via passage 48 and hydraulic line 52, to drive the output member 28b of actuator 28 in a clockwise direction as shown by arrow 55 in FIG. 4. Servo valves of the type suitable for use in this invention are manufactured by Moog, Inc., designated Model 77-IS.

Servo valves, in the manner described, selectively drive the output member 28b of the rotary actuator 28 on a bidirectional basis in accordance with electrical control signals input thereto from a suitable electronic controller. Since the controller forms no portion of this invention, it is sufficient to note at this point only that the controller provides electrical positional error signals to the servo valve to drive its associated wrist actuator as is necessary to drive its output member to a predetermined desired angular position. Such control signals are generated by comparing electrical signals correlated to the desired position of the actuator output member which are obtained from a suitable storage media, with electrical signals correlated to the actual position of the actuator output member generated by a suitable rotary position transducer associated with the actuator. As a result of this comparison process, a positional error signal is provided as a control input to the servo valve which tends to drive the rotary hydraulic actuator output member associated therewith in a direction to reduce to zero the error between the actual and desired actuator output member positions. Such rotary hydraulic actuator position control circuits, generally known as closed loop servo control circuits, are well known in the robot field and are not further described herein.

Secured to and extending axially from opposite ends of the central vane housing or cylinder 40 are combined cylinder head and bearing blocks 57 and 58. The cylinder heads 57 and 58 have bores 57a and 58a, respectively, which snugly rotatably seat the shaft 28b'. The inner end of the shaft 28b', which is preferably fabricated of aluminum, is provided with a reduced diameter section 60 to which is rigidly secured a hardened steel wear sleeve 61 which rotates within a bearing 62 mounted in a suitably provided internal recess in the inboard end of the bore 57a. The outer end of the bore 58a formed in the cylinder head 58 is also provided with a recess for containing a bearing 64 within which rotates a hardened steel wear sleeve 63. The wear sleeve 63 rotates with the aluminum shaft 28b'. Thus, the shaft 28b' is supported for rotation in the actuator body 28a at its opposite ends by the bearings 62 and 64 mounted in cylinder heads 57 and 58.

The shaft 28b' is prevented from moving in an axial direction relative to the actuator body 28a by the movable vane 44 secured to the shaft 28b' which is constrained against axial movement by the confronting end walls 57b and 58b of the cylinder heads 57 and 58 between which is sandwiched the cylinder 40.

The actuator 29, as noted previously, includes a body 29a which is removably secured to the block 28b" of the rotary output member 28b of actuator 28 by fasteners (not shown), and a rotary output member 29b which rotates relative to the actuator body 29a. The output member 29b of the actuator 29 includes a transverse block 29b" and an integral shaft 29b'. The shaft 29b' extends through and is supported for rotary motion relative to a pair of combined cylinder head and bearing blocks 70 and 71 between which is sandwiched a central vane housing or cylinder block 73 having a bore 74 of circular cross section which is substantially larger in diameter than the diameter of the shaft 29b'. Bores 70a and 71a are formed in cylinder heads 70 and 71, respectively, and snugly and slideably receive the shaft 29b'. Bores 70a and 71a are provided with bearings 75 and 76, respectively, within which rotate hardened steel sleeves 77 and 78 fastened to opposite ends of the shaft 29b' which is preferably fabricated of aluminum. The bore 74 has a fixed radially disposed vane 72 secured to it and the shaft 29b' has a movable radially disposed vane 79 fastened to it. Vanes 72 and 79 collectively divide the annular chamber defined by the bore 74 and the surface of the shaft 29b' into two variable volume chambers 81 and 82. Chambers 81 and 82 communicate via transverse passages 83 and 84 formed in cylinder 73 with hoses 85 and 86 which, in a manner to be described in more detail hereafter, are secured to the outputs 87b and 87a of a servo valve 87 for selectively bidirectionally rotating the shaft 29b' in response to suitable positional error signals input thereto from a controller which compares the desired and actual positions of the output member 28b of the actuator 29.

The shaft 29b' is constrained against axial movement relative to the body 29a by the confronting end faces 70b and 71b of cylinder heads 70 and 71 which axially sandwich the movable radial vane 79.

The actuator 30 of wrist assembly 26, like the other two actuators 28 and 29, includes a body 30a, which is removably secured to the transverse block 29b" by suitable fasteners 31, which constitutes the output of the actuator 29, and an output member 30b which rotates relative to the body 30a. The body 30a includes a central vane housing or cylinder 90 which is secured to and sandwiched between combined cylinder head and bearing blocks 91 and 92. The cylinder heads 91 and 92 are each provided with bores, only one of which, 91a, is shown, which snugly and rotationally seat opposite ends of the shaft 30b' which constitutes the rotary output member of the actuator 30. Fitted in suitable recesses in the bores of the cylinder heads 91 and 92, respectively, are bearings 93 within which rotate hardened steel wear sleeves 95 secured to opposite ends of the shaft 30b'.

The cylinder 90 is provided with a circular cross section bore 97 which has a diameter substantially larger than the diameter of the shaft 30b' which passes concentrically therethrough. The bore 97 is provided with a radially inwardly extending fixed vane 98 which is secured to the cylinder 90 by suitable fasteners. The shaft 30b' is provided with a radially outwardly extending movable vane 99 secured thereto with suitable fasteners. The fixed vane 98 and the movable vane 99 divide the cavity formed by the cylinder bore 97 and shaft 29b' into two variable chambers 100 and 101. Chambers 100 and 101 communicate via transverse passages 102 and 103, respectively, formed in the cylinder block 90 with hydraulic lines 104 and 105. In a manner to be described in more detail hereafter, hydraulic lines 104 and 105 are connected to the outputs 107a and 107b of a conventional servo valve 107 for selectively bidirectionally driving the output member 30b' of actuator 30 in response to positional error signals input thereto from a controller which continuously compares the actual angular position of the output member 30b of actuator 30 with the desired angular position of the output member 30b.

Axial movement of shaft 30b is prevented relative to the body 30a by the confronting surfaces 94 of the cylinder heads 91 and 92 which sandwiches the movable rotor vane 99 of the shaft 30b'.

Although not shown in FIGS. 1–6, each of the actuators 29 and 30, like the actuator 28, as well as the actuators associated with yoke 12, arm 18, and forearm 20, has associated with it a positional transducer for continuously providing electrical output signals correlated to the relative angular positions of their respective rotary output members relative to their respective rotary actuator bodies. Such angular position transducers are well known in robot technology and are not further described herein.

As previously noted, hydraulic lines 85 and 86 are connected to the outputs 87b and 87a of the servo valve 87. The connection of hydraulic lines 85 and 86 to the servo valve 87 is now described. Specifically, the outputs 87a and 87b of the servo valve 87 are connected to the inner ends of hydraulic lines 110 and 111 which run along the exterior of the forearm 20. The outer ends of hydraulic lines 110 and 111 are connected to the hydraulic lines 86 and 86, respectively, via internal passages formed in the actuator 28. As best seen when FIGS. 2 and 3 are combined, the outer end of hydraulic line 110 is connected to the inner end of hydraulic line 86 via a transverse passage 115 formed in cylinder head 57; an annular passage 117 formed in bore 57a of cylinder head 57, which connects to the inner end of transverse passage 115; a radial passage 118 formed in the shaft 28b' which is in alignment with the annular passage 117 regardless of the angular position of shaft 28b'; an axial passage 119 in shaft 28b' which communicates at its inner end with the radially innermost end of the transverse passage 118 in shaft 28b'; a radial passage 120 formed in the transverse block 28b" which communicates at its inner end with the axially outermost end of the axial passage 119 formed in the shaft 28b'. The radially outer end of the passage 120 is connected to the inboard end of the hose 86 whose outboard end connects via passage 84 with the chamber 82 of the cylinder 73 of actuator 29. Thus, chamber 82 of cylinder 73 of actuator 29 is connected to the output 87a of servo valve 87 via the path which includes transverse passage 84, hose 86, transverse passage 120, axial passage 119, radial passage 118, annular passage 117, transverse passage 115, and hose 110. Accordingly, chamber 82 of actuator 29 is connected to the servo valve 87 via a path which includes external hoses 86 and 110 and internal passages of actuator 28.

The outer end of the hose 111 is connected to the inner end of the hose 85 for connecting chamber 81 of actuator 29 with the output 87b of servo valve 87 via a path which includes a transverse passage 125 formed in the cylinder block 57 of actuator 28; an annular passage 126 formed in the bore 57a of the cylinder block 57 which communicates with the inner end of transverse passage 125; a radial passage 127 formed in the actuator shaft 28b' which communicates at its outer radial end with the annular passage 126 formed in the bore 57a of bearing block 57 regardless of angular position of shaft 28b; an axially extending passage 128 formed in the shaft 28b' which communicates at its inner axial end with the inner radial end of the radial passage 127 formed in the shaft 28b'; a transverse passage 129 formed in the transverse block 28b' which communicates at its inner end with the outer axial end of the axial passage 128 formed in the shaft 28b'. The outer end of the transverse passage 129 formed in the transverse block 28b" is connected to the inner end of the hydraulic line 85. Thus, chamber 81 of the cylinder 73 of actuator 29 is connected to the servo valve 87 via the path which includes transverse passage 83, hydraulic line 85, transverse passage 129, axial passage 128, radial passage 127, annular passage 126, transverse passage 125, and line 111. Accordingly, chamber 81 of actuator 29 is connected to servo valve 87 via a path which includes external hoses 85 and 111 and internal passages of actuator 28.

The hydraulic lines 104 and 105 connected to the chambers 100 and 101 of the cylinder 90 of actuator 30 via passages 102 and 103 are connected to the outputs 107a and 107b of the servo valve 107 via lines 140 and 141 and paths through the actuators 28 and 29 which are now described. Specifically, the outer end of line 140 is connected to the inner end of line 104 via the path which includes a transverse passage 142 formed in cylinder head 58; an annular passage 143 formed in the bore 58a of the cylinder head 58 which communicates with the inner end of the passage 142; a radial passage 144 formed in the shaft 28b' which at its radial outboard end communicates with the annular passage 143 regardless of the angular orientation of the shaft 28b' relative to the body 28a; an axial passage 145 formed in the shaft 28b' which at its inner end communicates with the inner radial end of the radial passage 144 formed on the shaft 28b'; a radial passage 146 formed in the transverse block 28b" which at its inner end communicates with the outer end of the axial passage 145 formed in the shaft 28b'; an external hydraulic line 147 which at its inner end communicates with the outer end of the passage 146; a transverse passage 148 formed in the cylinder head 70 of actuator 29 which at its outer end communicates with the outer end of the hydraulic line 147; an annular passage 149 formed in the bore 70a of the cylinder head 70 which communicates with the inner end of the passage 148 formed in the cylinder head 70; a radial passage 150 formed in the shaft 29b' which at its outer radial end communicates with the annular passage 149 regardless of the angular orientation of the shaft 29b' relative to the cylinder 73 of actuator 29; an axial passage 151 formed in the shaft 29b' which at its inner end communicates with the inner radial end of the radial passage 150 formed in the shaft 29b'; a transverse passage 152 formed in the transverse block 29b" which at its inner end communicates with the outer end of the axial passage 151 formed in the shaft 29b'. The outer end of the transverse passage 152 formed in transverse block 29b" is connected to the inner end of the hose 104. Thus, the chamber 100 formed in the cylinder 90 of actuator 30 communicates with the output 107a of servo valve 107 via a path which includes transverse passage 102, external hydraulic line 104, transverse passage 152, axial passage 151, radial passage 150, annular passage 149, transverse passage 148, external hydraulic hose 147, transverse passage 146, axial passage 145, radial passage 144, annular passage 143, transverse passage 142, and external hydraulic line 140. Hence, it is apparent that chamber 100 of actuator 30 is connected to the servo valve 107 by a path which includes the combination of internal passages in actuators 28 and 29 and external hydraulic lines 140, 147, and 104.

The output line 105 which is connected to the chamber 101 of cylinder 90 via passage 103 is connected to the outer end of the external hose 141 eminating from the output 107b of servo valve 107 via the path which includes a transverse passage 160 formed in the cylinder head 58 of actuator 28 which at its outer end connects to the outer end of hose 141; an annular passage 161 formed in the bore 58a of the cylinder head 58 which communicates with the inner end of the transverse passage 160 formed in the cylinder head 58; a radial passage 162 formed in the shaft 28b' which communicates at its outer end with the annular passage 161 regardless of the angular position of the shaft 28b' relative to the body 28a of the actuator 28; an axial passage 163 formed in the shaft 28b' which at its inner end communicates with the inner radial end of the radial passage 162; a transverse passage 164 formed in the block 28b'' which at its inner end communicates with the outer axial end of the passage 163 formed in the shaft 28b'; an external hose 165 interconnecting the internal passages of the actuators 28 and 29 and which at its inner end is connected to the outer end of the transverse passage 164 formed in transverse block 28b''; a transverse passage 166 formed in cylinder head 70 which at its outer end is connected to the outer end of the external hydraulic line 165; an annular passage 167 formed in the bore 70a of the cylinder head 70 which communicates with the inner end of the transverse passage 166; a radial passage 168 formed in the shaft 29b' which at its outer radial end communicates with the annual passage 167 regardless of the angular orientation of the shaft 29b' relative to the body 29a of actuator 29; an axial passage 169 formed in the shaft 29b' which at its inner end communicates with the inner radial end of the passage 168 formed in the shaft 29b'; a transverse passage 170 formed in the transverse block 29b'' which at its inner end communicates with the outer axial end of the axial passage 169 formed in the shaft 29b'. The outer end of the transverse passage 170 is connected to the inner end of the hose 105. Thus, the chamber 101 in cylinder 90 of actuator 30 is connected to the output 107b of the servo valve 107 via passage 103, external hydraulic line 105, transverse passage 170, axial passage 169, radial passage 168, annular passage 167, transverse passage 166, external hydraulic line 165, transverse passage 164, axial passage 163, radial passage 162, annular passage 161, transverse passage 160, and external hydraulic line 141. Accordingly, it is apparent that chamber 101 of the cylinder 90 formed in the outermost actuator 30 is connected to the servo valve 107 via internal passages formed in the actuators 28 and 29 and external hydraulic lines 141, 166, and 105.

To avoid fluid leakage from the annular passages 118 and 126 formed in the bore 57a of cylinder head 57, circular seals 180, 181, and 182 are provided in annular grooves formed in the bore 57a on either side of the annular hydraulic passages 126 and 118. The circular seals 180 and 181 on either side of the hydraulic passage 126 seal the passage 126 with respect to the interface between the shaft 28b' and the bore 57a located on either side of the annular hydraulic passage 126. Similarly, the circular seals 181 and 182 on either side of the hydraulic passage 118 seal the passage 118 with respect to the interface between the shaft 28b' and the bore 57a on either side of the hydraulic passage 118. Similar circular seals, although not separately described and referenced with numerals, are associated with annular paths 161 and 143 in cylinder head 58, and passages 149 and 167 in cylinder head 70.

FIG. 7 depicts a preferred form of the wrist assembly electrical cable arrangement for providing electrical connections to the wrist assembly actuator position transducers, to further minimize the overall envelope of the wrist assembly. More specifically, and as shown in FIG. 7, each of the actuators 28, 29, and 30 of the wrist assembly includes a rotary position transducer 200, 202, and 204, respectively associated with the output shafts 28b', 29b', and 30b' of the actuators 28, 29, and 30. The transducer 200 is mounted to the inboard end of the cylinder head 57 of actuator 28. The transducer 200 includes a rotatable input element connected to the end of the shaft 28b' located within the wear sleeve 60 which rotates with the shaft 28b'. The axis of rotation of the rotary input element of the transducer 200 is coaxial with the axis of rotation of the shaft 28b'. The transducer 202 associated with the shaft 29b' of actuator 29 and the transducer 204 associated with the output shaft 30b' of actuator 30 are constructed and mounted with respect to cylinder heads 70 and 91 of actuators 29 and 30 in a manner identical to the manner in which transducer 200 is constructed and mounted to the cylinder head 57 of actuator 28.

Each of the rotary position transducers 200, 202, and 204 have electric terminals associated therewith to provide continuously varying electrical output signals correlated to the continuously varying angular positions of their respectively associated actuator output shafts 28b', 29b', and 30b'. To facilitate interconnection of the electrical output terminals of the position transducers 200, 202, and 204 with a suitable electrical connector 206 mounted on the outboard end 20a of the robot arm 20, a flexible multi-conductor cable 210 is provided. The cable 210 includes a first generally flat section 212 which extends between the connector 206 on the outer end 20a of robot arm 20 to a point proximate the output of the actuator 28 between the cylinder head 58 of actuator 28 and the transverse block 28b'' of actuator 28. Several conductors 214 of the cable 212 are terminated at approximately the midpoint thereof and extend rearwardly (as viewed in FIG. 7) to facilitate connection to the electrical outputs of transducer 200 associated with actuator 28.

Extending at right angles from the outboard end of the cable section 212 into the space between cylinder head 58 and transverse block 28b'' of actuator 28 and partially encircling the output shaft 28b' of actuator 28 is a generally semicircular section of cable 216 which includes two portions thereof 216a and 216b which are folded back upon themselves. The end of cable section 216 remote from the end connected at right angles to cable section 212 is a cable section 218 which is secured to the body 29a of actuator 29. The end of cable section 218 remote from the end connected to cable section 216 is split into oppositely directed sections 220a and 220b which are each secured to actuator body 29a and disposed generally parallel to the axis of actuator shaft 29b'. The right end (as viewed in FIG. 7) of the cable section 220a is connected to the electrical output terminals of the transducer 202. The other end of the cable section 220b is connected to one end of a two-section semicircular section 222 disposed between cylinder head 71 and transverse block 29b'' of actuator 29. The two sections of the semicircular cable section 222 include a first section 222a which is connected to the cable section 220b and a second section 222b which is connected to a cable end section 224 mounted to an outer surface of the body 30a of actuator 30. The outer end of the cable section 224 is connected to the electrical output terminals of the transducer 204.

In operation, as the output shaft 29b' is rotated by actuator 29 relative to the actuator body 29a, the transverse block 29b'' fastened to the body 30a of actuator 30 rotates the body 30a of actuator 30 relative to the body 20a of actuator 29. As the actuator body 30a of actuator 30 is rotated relative to the actuator body 29a of actuator 29, the semicircular cable sections 222a and 222b of semicircular cable section 222 slide over each other increasing and decreasing their respective lengths in complementary, or inverse, fashion, or vice versa depending on the direction of rotation, thereby permitting contiguous cable sections 224, 220a and 220b, which are secured to actuator bodies 30a and 29a and connected to the semicircular cable section 222 on either side thereof, to move relative to each other. In similar fashion, when the output shaft 28b' of actuator 28 moves relative to actuator body 28a, the transverse block 28b" secured to actuator body 29 rotates the actuator body 29a relative to the actuator body 28a. As actuator body 29a moves relative to actuator body 28a, the semicircular sections 216a and 216b slide over each other decreasing and increasing their length, respectively, or vice versa depending upon the direction of rotation. Thus, and by reason of the sliding action of semicircular sections 216a and 216b, cable sections 212 and 218 can move relative to each other.

To assist containment of cable sections 216 and 222 in the respective spaces between actuator elements 58 and 28b" and between actuator elements 71 and 29b", respectively, in partial encircling relationship to actuator output shafts 28b' and 29b', cylindrical shields or covers 230 and 232, respectively, are mounted to the cylinder heads 58 and 71 of actuator bodies 28 and 29, respectively, by suitable fasteners passing through tabs extending from the cylindrical covers. As best seen in FIG. 8, the cover 232 has an integral radially inwardly extending flange section 232a and an associated separate plate 232b fastened to plate 29b" which are disposed in sandwiching relationship to the semicircular cable section 222 to space the edges of the cable section 222 from the outboard face of cylinder head 71 and the confronting face of transverse block 29b" of actuator 28. Plate 230b and flange 230a of similar construction are provided on either end of the cylindrical enclosure 230 to space the opposite edges of the semicircular cable section 216 from the outer end wall of the cylinder head 58 and the confronting outer wall of the transverse block 28b" of actuator 28'. To facilitate ease of installation, the cylindrical cover 230 and its associated flange 230a and plate 230b are constructed in semicircular sections which when assembled and mounted in operative position include openings 230c and 230d which loosely encircle the output shaft 28b' of actuator 28. Similarly, the cover 232 and its associated flange 232a and plate 232b are also each fabricated of semicircular sections which when assembled and operatively mounted provide openings 232c and 232d which loosely encircle the output shaft 29b' of actuator 29. The plates 230a, 232a are secured to the output members 28b", 29b" such that they rotate with those members, and the cylindrical covers 230 and 232 with their integral flanged portions 230b and 232b are secured to the stationary bearing blocks 58, 71.

The cable arrangement for interconnecting the transducers 200, 202, and 204 relative to a connector 206 fastened to the arm 20 enables relative movement between the actuators 28, 29, and 30 without significantly increasing the envelope of the wrist assembly 26 and still provides suitable electrical connections to be made from the connector 206 on arm 20 to the actuator transducers 200, 202, and 204.

The interconnection of the actuators 29 and 30 with their respective servo valves 87 and 107 via a path which includes both internal passages through actuators 28 and 29, respectively, and external hoses provides hydraulic paths between the actuators and their respective servo valves which are not unduly restricted by sharp 90 degree changes in fluid direction, thereby promoting relatively smooth flow between the servo valves and their respective actuators. In addition, the foregoing servo valve/actuator interconnection scheme provides actuators which have bodies which are not unduly weakened by too many internal passages in the walls thereof. For example, were the hydraulic flow paths between the servo valves 87 and 107 and their respective actuators 29 and 30 to be totally internalized, it would be necessary to replace all external hoses interconnecting the actuators with internal hydraulic passages in the actuator bodies and transverse blocks of the actuator output members. Only in this way could the rotary output member of one valve be internally hydraulically connected with the body of the succeeding valve. Unfortunately, the additional internal hydraulic passages can only be provided by drilling additional intersecting passages in the transverse blocks which constitute the output of the actuators and in the cylinders of the succeeding actuators to which the transverse blocks are detachably secured. The addition of further drilled passages in the transverse blocks and in the cylinders unnecessarily adds additional 90 degree direction changes in the fluid paths which unnecessarily restrict fluid flow. Moreover, the provision of additional drilled passages in the actuators, particularly in the walls of the cylinder of the actuator body, unnecessarily weakens the cylinder since the holes are generally in a tangential direction to the cylinder bore rather than in a radial direction. While the actuator cylinders could have their walls substantially thickened to accommodate the addition of internal tangential fluid passages in the cylinder walls, this unnecessarily increases the mass of the actuator. The passages in the walls of the actuator cylinders to which the hoses connect are accommodated without thickening the cylinder walls because they are in a radial direction.

As noted previously, the rotary output members 28b and 29b of actuators 28 and 29 are detachably mounted to the bodies 29a and 30a of actuators 29 and 30 by suitable fasteners. Similarly, the body 28a of actuator 28 is detachably mounted by suitable fasteners to the outer end 20a of robot arm 20. The importance of the foregoing detachable mounting scheme is that it facilitates quick and easy repair in the field of the robot wrist assembly 26 in the event that one of the wrist actuators 28, 29, or 30 becomes defective. Specifically, and by way of example, should the intermediate wrist actuator 29 become defective, it is only necessary to disconnect the actuator body 29a from the output member 28b of actuator 28 and disconnect the output member 29b of actuator 29 from the body 30a of actuator 30. Once this has been done, the actuator 29 can be removed and a suitable replacement actuator installed. The replacement actuator is installed by connecting the body thereof to the output member 28b of actuator 28 and its rotary output member to the body 30a of actuator 30. Of course, it is necessary to disconnect hoses 85 and 86 and hoses 104 and 105 from the actuator 29 which is being replaced and to reconnect the hoses 85 and 86 and the hoses 104 and 105 to the new actuator. Similarly, it is necessary to disconnect from the actuator 29 being replaced, and reconnect to the new actuator, the portions 218 and 220 of the electrical cable 210.

The hydraulic interconnections between the various hydraulic conduits or hoses and the rotary hydraulic actuators preferably take the form of the coupling shown in FIG. 9. The coupling principally includes three elements, namely, the end of a thin-walled tube 300 provided with an external collar 302 and an O-ring 304, a port 306 of standard configuration provided in the hydraulic actuator wall 308 with a standard forming tool, and a clamp 310 pivotally connected to the actuator wall 308 with a suitable fastener 312. The port 306 has an inner section 306a which snugly embraces the periphery of the extremity 300a of the tube end 300, an intermediate section which functions as a seat 306b for the O-ring 304, and an upper section 306c which snugly receives and locates the collar 302 formed on the tube end 300. The clamp 310 includes a semicircular section 310a which partially encircles the tube 300 in overlying relationship to the collar 302 when the clamp is pivoted to its operative clamping position (not shown in FIG. 9) for the purpose of locking the tube in port 306 with the O-ring 304 in a slightly compressed state to assure a good seal between the tube and the port. When the clamp 310 is pivoted about the axis of the fastener 312 to the inoperative position shown in FIG. 9 in which the clamp section 310a does not overlie the tube collar 302, the tube 300 is free to be removed from the port 306, effectively disconnecting the coupling between the tube and the port.

An important advantage of the coupling shown in FIG. 9 is that it facilitates rapid connection and disconnection of the external hydraulic conduit relative to the actuator. Additionally, an effective coupling is provided without the need for tapping threads in the port 306.

I claim:

1. A wrist assembly for a robot comprising:
   a first rotary fluid actuator having a first actuator body with an exterior and an output member movable relative to said body, said first actuator output member including a shaft rotatable within a bore in said first actuator body, said first actuator body having at least one chamber of variable volume which when input with pressurized fluid causes said output member to move relative to said first actuator body, said first actuator body having a first fluid passage therein interconnecting said chamber with the exterior of said body through which pressurized fluid is input to said chamber to move said output member relative to said first actuator body;
   a second fluid actuator having a second actuator body with an exterior and an output member movable relative to said second actuator body, said second actuator body having at least one chamber of variable volume which when input with pressurized fluid causes said second actuator output member to move relative to said second actuator body, said second actuator body having a second fluid passage therein interconnecting said second actuator chamber with the exterior of said second actuator body through which pressurized fluid is input to said second actuator chamber to move said second output member relative to said second actuator body;
   means mounting said first actuator output member to said second actuator body to move said second actuator body relative to said first actuator body when pressurized fluid is input to said first actuator chamber;
   a first fluid conduit connected to said first passage to facilitate input of pressurized fluid to said first actuator chamber to move said first actuator output member, and in turn said second actuator body, relative to said first actuator body, said first fluid conduit located externally relative to said first and second actuators; and
   means to transport pressurized fluid to said second passage for input to said second actuator chamber to move said second actuator output member relative to said second actuator body, including:
   (a) a third fluid passage through, and internal relative to, said first actuator, said third passage having an inlet and an outlet and being unconnected to said first passage and said first actuator chamber, said third fluid passage including (i) a first passage in said first actuator output member connected to said outlet, (ii) a second passage in said first actuator body connected to said inlet, and (iii) a fluid coupling for interconnecting said two last-mentioned passages independent of the rotary position of said shaft relative to said first actuator body;
   (b) a second fluid conduit connected to said inlet, said second fluid conduit being located externally relative to said first and second actuators; and
   (c) a third fluid conduit connected between said outlet and said second fluid passage, said third fluid conduit being located externally relative to said first and second actuators;
   whereby pressurized fluid input to said second fluid conduit is transported to said third fluid conduit for input to said second actuator chamber through said second passage to actuate said second actuator via a fluid path which includes an internal passage in said first actuator.

2. A wrist assembly for a robot comprising:
   a first rotary fluid actuator having a first actuator body with an exterior and an output member movable relative to said first actuator body, said first actuator output member including a first shaft rotatable within a bore in said first actuator body, said first actuator body having at least one chamber of variable volume which when input with pressurized fluid causes said output member to move relative to said first actuator body, said first actuator body having a first fluid passage therein interconnecting said chamber with the exterior of said first actuator body through which pressurized fluid is input to said chamber to move said output member relative to said first actuator body;
   a second fluid actuator having a body with an exterior and an output member movable relative to said second actuator body, said second actuator body having at least one chamber of variable volume which when input with pressurized fluid causes said second actuator output member to move relative to said second actuator body, said second actuator body having a second fluid passage therein interconnecting said second actuator chamber with the exterior of said second actuator body through which pressurized fluid is input to said second actuator chamber to move said second output member relative to said second actuator body;

means mounting said first actuating output member to said second actuator body to move said second actuator body relative to said first actuator body when pressurized fluid is input to said first actuator chamber;

a first fluid conduit connected to said first passage to facilitate input of pressurized fluid to said first actuator chamber to move said first actuator output member, and in turn said second actuator body, relative to said first actuator body, said first fluid conduit located externally relative to said first and second actuators; and means to transport pressurized fluid to said second passage for input to said second actuator chamber to move said second actuator output member relative to said second actuator body, including:

(a) a third fluid passage through, and internal relative to, said first actuator, said third passage having an inlet and an outlet and being unconnected to said first passage and said first actuator chamber, said third fluid passage including (i) a circular fluid path surrounding said first shaft at the interface of said shaft and said bore; (ii) a second passage in said first actuator body interconnecting said inlet and said circular path; (iii) an axial passage in said shaft; (iv) a first transverse passage in said shaft interconnecting one end of said axial passage and said circular path; and (v) a first passage in said first output member interconnecting said outlet and the other end of said axial passage;

(b) a second fluid conduit connected to said inlet, said second fluid conduit being located externally relative to said first and second actuators; and (c) a third fluid conduit connected between said outlet and said second fluid passage, said third fluid conduit being located externally relative to said first and second actuators;

whereby pressurized fluid input to said second fluid conduit is transported to said third fluid conduit for input to said second actuator chamber through said second passage to actuate said second actuator via a fluid path which includes an internal passage in said first actuator.

3. The wrist assembly of claims 1 or 2 further including:

a position transducer mounted to said second actuator and having an input element responsive to the position of said second actuator output member relative to said second actuator body, and a flexible electrical cable having a first end connected to said position transducer and having a second end mounted to said first actuator body, said electrical cable including an intermediate section folded back upon itself to provide superimposed first and second cable portions connected to each other at the fold thereof, said intermediate section being formed into a generally arcuate shape partially encircling said shaft between said first and second actuator bodies, said first and second cable portions having lengths which change in inverse relation as said first and second actuator bodies are rotated relative to each other by rotation of said shaft within said bore of said first actuator.

4. The wrist assembly of claims 1 or 2 further including:

a position transducer mounted to said second actuator and having an input element responsive to the position of said second actuator output member relative to said second actuator body, a flexible electrical cable having a first end connected to said position transducer and having a second end mounted to said first actuator body, said electrical cable including an intermediate section folded back upon itself to provide superimposed first and second cable portions connected to each other at the fold thereof, said intermediate section being formed into a generally arcuate shape partially encircling said shaft between said first and second actuator bodies, sad first and second cable portions having lengths which change in inverse relation as said first and second actuator bodies are rotated relative to each other by rotation of said shaft within said bore of said first actuator, and arcuate enclosure means encircling said arcuate intermediate cable section to limit radially outward movement of said intermediate cable section relative to the axis of said first shaft.

5. A wrist assembly for a robot comprising:

a first rotary fluid actuator having a body and an output member rotatable relative thereto when pressurized fluid is input to said first actuator, a first fluid conduit connected to said first actuator to input pressurized fluid thereto to rotate said output member and said body of said first actuator relative to each other, a second fluid actuator having a body and an output member movable relative thereto when pressurized fluid is input to said second actuator at an input port thereof, said second actuator body being connected to said first actuator output member to be rotatably driven thereby, fluid path means connected to said second actuator to move said second actuator output member relative to said second actuator body, said fluid path means including:

(a) a first internal fluid path located within said first actuator and connectable at one end to a first source of pressurized fluid, (b) a first external fluid path located outside of said first and second actuators and interconnecting the other end of said first internal fluid path within said first actuator and said input port of said second actuator, (c) said second actuator output member being moved relative to said second actuator body by the flow of pressurized fluid thereto through the series-connection of said first internal path of said first actuator and said first external path outside of both said first and second actuators, a position transducer mounted to said second actuator and having an input element responsive to the position of said second actuator output member relative to said second actuator body, an electrical cable having a first end connected to said position transducer and having a second end mounted to said first actuator body, said electrical cable including an intermediate section folded back upon itself to provide superimposed first and second cable portions connected to each other at the fold thereof, said intermediate section being formed into a generally arcuate shape partially encircling said first actuator output member between said first and second actuator bodies, said first and second cable portions having lengths which change in inverse relation as said first and second actuator bodies are rotated relative to each other by rotation of said first output member relative to said first actuator body.

6. A wrist assembly for a robot comprising:

a first rotary fluid actuator having a first actuator body and a first output member rotatable relative thereto when pressurized fluid is input to said first actuator, a first fluid conduit connected to said first actuator to input pressurized fluid thereto to rotate said first output member and said body of said first actuator relative to each other, a second rotary fluid actuator having a second actuator body and a second output member rotatably movable relative thereto when pressurized fluid is input to said second actuator at an input port thereof, said second actuator body being connected to said first actuator output member to be rotatably driven thereby, fluid path means connected to said second actuator to move said second actuator output member relative to said second actuator body, said fluid path means including:

(a) a first internal fluid path located within said first actuator and connectable at one end to a first source of pressurized fluid, (b) a first external fluid path located outside of said first and second actuators and interconnecting the other end of said first internal fluid path within said first actuator and said input port of said second actuator, (c) said second actuator output member being moved relative to said second actuator body by the flow of pressurized fluid thereto through the series-connection of said first internal path of said first actuator and said first external path outside of both said first and second actuators, a third fluid actuator having a third actuator body and a third output member movable relative thereto when pressurized fluid is input to said second actuator at an input port thereof, said third actuator body being connected to said second actuator output member to be rotatably driven thereby;

additional fluid path means connected to said third actuator to move said third actuator output member relative to said third actuator body, said additional fluid path means including:

(a) an additional internal fluid path located within said first actuator and connectable at one end to a second source of pressurized fluid, (b) an internal fluid path located within said second actuator and having inlet and outlet ends, (c) a second external fluid path located outside said first and second actuators and interconnecting the other end of said additional internal fluid path in said first actuator to said inlet end of said internal path located within said second actuator, (d) a third external fluid path located outside said second and third actuators and interconnecting the outlet of said internal path located within said second actuator and said input port of said third actuator, and (e) said third actuator output member being moved relative to said third actuator body by the flow of pressurized fluid thereto through the series-connection of said second internal path within said first actuator, said internal path within said second actuator, and said second and third external fluid paths outside said first and second actuators, and said second and third actuators, respectively, all said external fluid paths having lengths which are approximately equal to approximately equate the responses of said second and third actuators.

7. The wrist assembly of claim 6 further including means for detachably mounting said second actuator body to said first actuator output member to facilitate replacement of said first actuator without replacement of said second actuator and wherein said third actuator body is detachably mounted to said second actuator output member to facilitate replacement of said second actuator without replacement of said third actuator.

8. The wrist assembly of claim 6 further including:

a first position transducer mounted to said second actuator and having an input element responsive to the position of said second actuator output member relative to said second actuator body, a second position transducer mounted to said third actuator and having an input element responsive to the position of said third actuator output member relative to said third actuator body, an electrical cable including a first end mounted to said first actuator body and a second end mounted to said second transducer, said cable further including:

(a) a first intermediate section folded back upon itself to provide superimposed first and second cable portions connected to each other at the fold thereof, said intermediate section being formed into a generally arcuate shape partially encircling said first actuator output member between said first and second actuator bodies, said first and second cable portions having lengths which change in inverse relation as said first and second actuator bodies are rotated relative to each other by rotation of said first actuator output element, (b) a second intermediate section folded back upon itself to provide superimposed first and second cable portions connected to each other at the fold thereof, said intermediate section being formed into a generally arcuate shape partially encircling said second actuator output member between said second and third actuator bodies, said first and second cable portions having lengths which change in inverse relation as said second and third actuator bodies are rotated relative to each other by rotation of said first actuator output member, (c) a third cable section mounted to said second actuator valve body for movement therewith and electrically interconnecting said first and second intermediate cable sections, said third cable section also being electrically connected to said second transducer.

* * * * *

UNITED STATES PATENT AND TRADEMARK OFFICE
CERTIFICATE OF CORRECTION

PATENT NO. : 4,459,898
DATED : July 17, 1984
INVENTOR(S) : Martin J. Harjar and Jeffrey S. Noss It is certified that error appears in the above—identified patent and that said Letters Patent is hereby corrected as shown below:

Column 7, line 21, "86" second occurrence should be -- 85 --.

Column 7, line 64, "28b' " should be -- 28b'' --.

Column 10, line 68, "20a" should be -- 29a --.

Column 15, line 1, "actuating" should be -- actuator --.

Column 16, line 14, "sad" should be -- said --.

Signed and Sealed this

Twenty-fifth Day of December 1984

[SEAL]

Attest:

GERALD J. MOSSINGHOFF

Attesting Officer

Commissioner of Patents and Trademarks